(12) United States Patent
Van Baelen

(10) Patent No.: US 10,429,595 B2
(45) Date of Patent: Oct. 1, 2019

(54) CLOSURE WITH AXIAL PULL PROTECTION FOR CONNECTORIZED CABLES

(71) Applicant: CommScope Connectivity Belgium BVBA, Kessel-Lo (BE)

(72) Inventor: David Jan Irma Van Baelen, Winksele (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 15/560,121

(22) PCT Filed: Mar. 18, 2016

(86) PCT No.: PCT/EP2016/056068
§ 371 (c)(1),
(2) Date: Sep. 20, 2017

(87) PCT Pub. No.: WO2016/150886
PCT Pub. Date: Sep. 29, 2016

(65) Prior Publication Data
US 2018/0100975 A1    Apr. 12, 2018

Related U.S. Application Data

(60) Provisional application No. 62/136,256, filed on Mar. 20, 2015.

(51) Int. Cl.
*G02B 6/38* (2006.01)
*G02B 6/44* (2006.01)

(52) U.S. Cl.
CPC .......... *G02B 6/3897* (2013.01); *G02B 6/4446* (2013.01); *G02B 6/4471* (2013.01); *G02B 6/4478* (2013.01)

(58) Field of Classification Search
CPC .............................. G02B 6/4446; G02B 6/4478
See application file for complete search history.

(56) References Cited

U.S. PATENT DOCUMENTS 9,885,847 B2    2/2018  Kowalczyk et al.
2012/0063735 A1*  3/2012  Nair .................... G02B 6/4446
                                                              385/135
(Continued)

FOREIGN PATENT DOCUMENTS

WO    2014/096134 A1    6/2014
WO    2014/118221 A1    8/2014

OTHER PUBLICATIONS

International Search Report and Written Opinion of the International Searching Authority for corresponding International Patent Application No. PCT/EP2016/056068 dated Jun. 17, 2016, 8 pages.

*Primary Examiner* — Sung H Pak
(74) *Attorney, Agent, or Firm* — Merchant & Gould P.C.

(57) ABSTRACT

A closure (100) is configured to hold one or more termination arrangements (120) at which one or more connectorized ends of optical cables can be received. The closure (100) provides axial pull-out protection for the connectorized ends (142) of the optical cables (140). In certain implementations, the closure (100) provides axial pull-out protection for the connectorized ends (142) of optical cables (140) arranged in multiple layers within the closure (100). In certain implementations, the closure (100) provides axial pull-out protection for standard optical connectors (e.g., standard SC connectors, standard LC connectors, standard LX.5 connectors, standard MPO connectors, etc.). The axial pull-out protection can be in the form of a cover (130). Cable bend protection (136) may also be provided by the cover.

20 Claims, 7 Drawing Sheets

(56) References Cited

U.S. PATENT DOCUMENTS

2012/0263425 A1 10/2012 Kowalczyk et al.
2016/0349474 A1 12/2016 Kowalczyk et al.

\* cited by examiner

CLOSURE WITH AXIAL PULL PROTECTION FOR CONNECTORIZED CABLES

CROSS-REFERENCE TO RELATED APPLICATION

This application is a National Stage Application of PCT/EP2016/056068, filed on Mar. 18, 2016, which claims the benefit of U.S. patent application Ser. No. 62/136,256, filed on Mar. 20, 2015, the disclosures of which are incorporated herein by reference in their entireties. To the extent appropriate, a claim of priority is made to each of the above disclosed applications.

SUMMARY

The present invention relates to a closure configured to hold one or more termination arrangements at which one or more connectorized ends of optical cables can be received. The closure provides axial pull-out protection for the connectorized ends of the optical cables. In certain implementations, the closure provides axial pull-out protection for the connectorized ends of optical cables arranged in multiple layers within the closure. In certain implementations, the closure provides axial pull-out protection for standard optical connectors (e.g., standard SC connectors, standard LC connectors, standard LX.5 connectors, standard MPO connectors, etc.). The axial pull-out protection can be in the form of a cover. Cable bend protection may also be provided by the cover.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The figures illustrate an example closure 100 (FIG. 1) configured to hold one or more termination arrangements 120 (FIG. 3) at which one or more connectorized ends of optical cables can be received. The closure 100 provides axial pull-out protection for the connectorized ends 142 of the optical cables 140. In certain implementations, the closure 100 provides axial pull-out protection for the connectorized ends 142 of optical cables 140 arranged in multiple layers within the closure 100. In certain implementations, the closure 100 provides axial pull-out protection for standard optical connectors (e.g., standard SC connectors, standard LC connectors, standard LX.5 connectors, standard MPO connectors, etc.).

Figure 1:
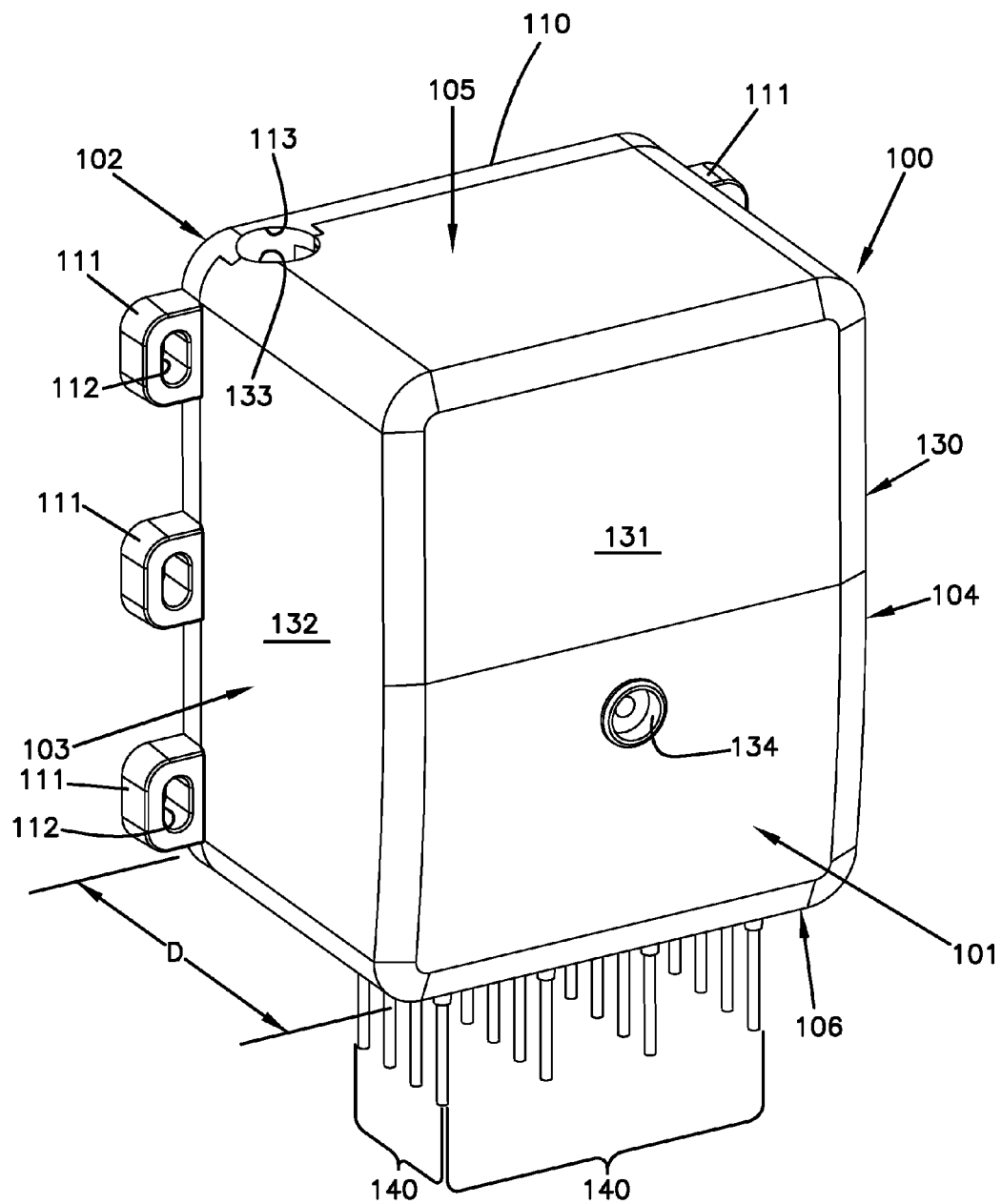
FIG. 1 is a perspective view of an example closure at which optical cables can be received at internal ports.
Figure 2:
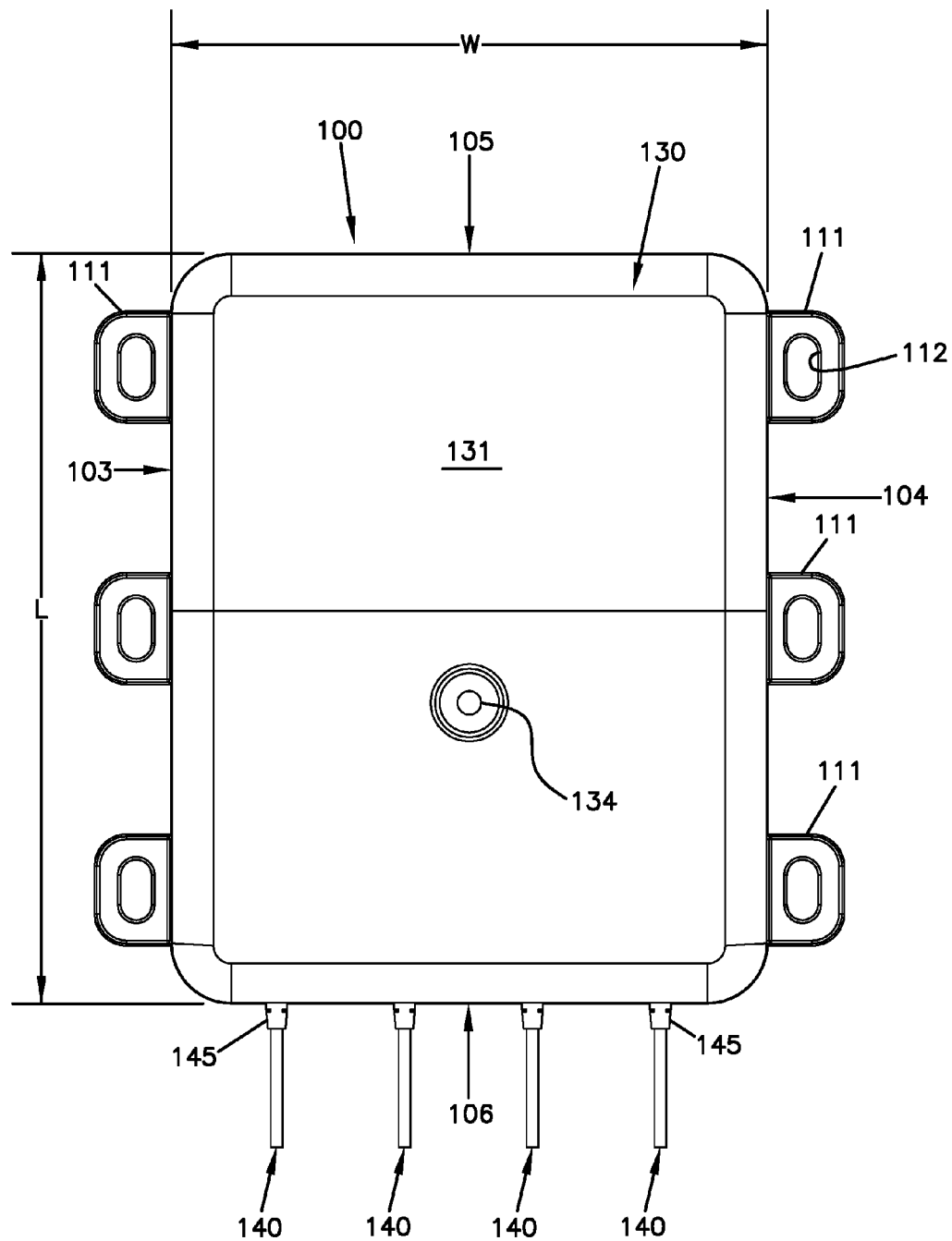
FIG. 2 is a front elevational view of the closure of FIG. 1.

As shown in FIGS. 1 and 2, the closure 100 has a depth D extending between a front 101 and a rear 102, a width W extending between a first side 103 and a second side 104, and a length L extending between a top 105 and a bottom 106. It is noted that the terms "front," "rear," "top," and "bottom" are not intended to imply an orientation for the closure 100, but rather are used for convenience and clarity. In the example shown, the optical cables 140 extend into the closure 100 through the bottom 106. In other examples, however, the optical cables 140 can enter the closure 100 through other sides. In the example shown, an input cable can pass through the top 105 of the closure 100, the bottom 106 of the closure 100, or both (e.g., if less than all of the optical fibers of the input cable are utilized at the closure 100).

Figure 3:
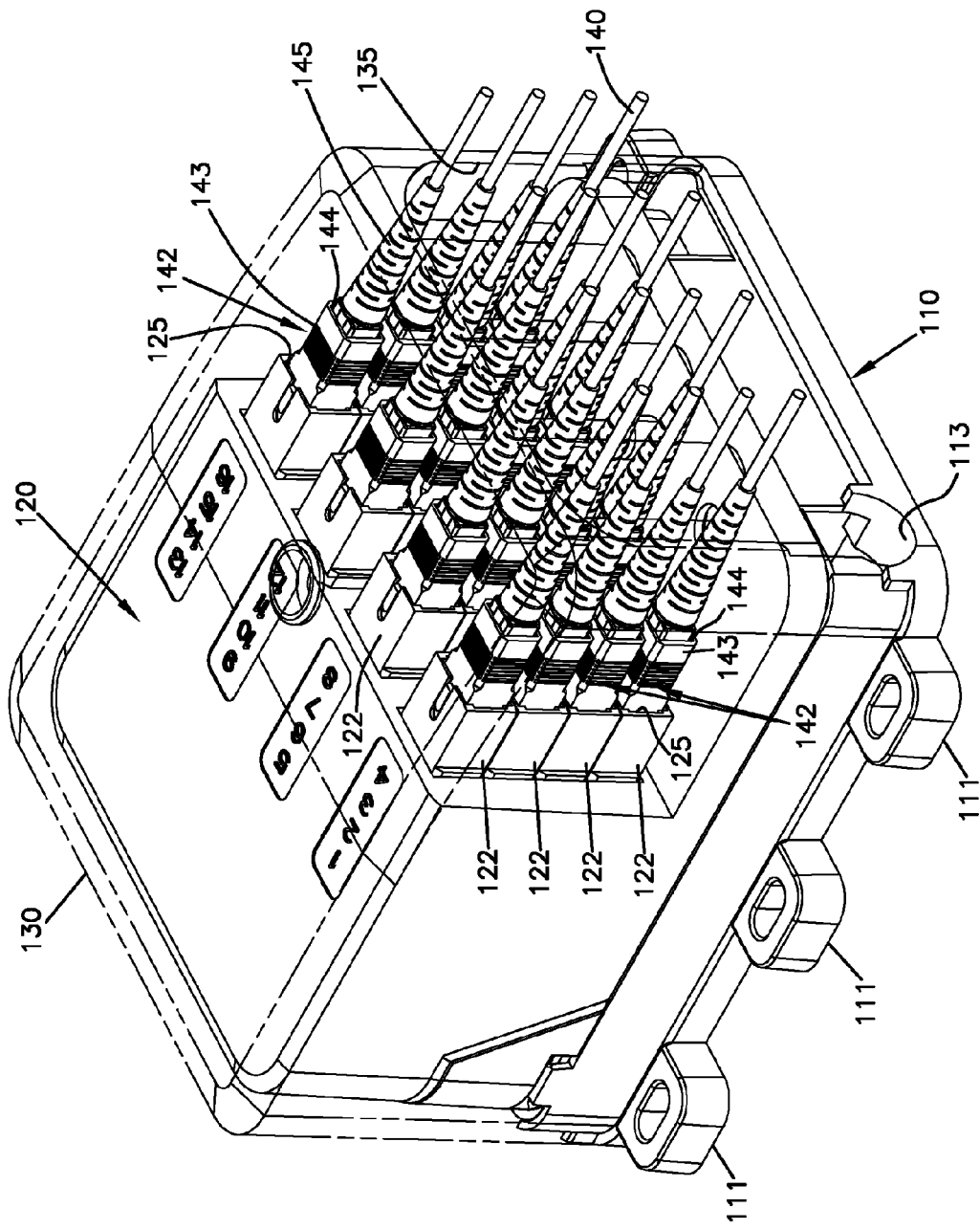
FIG. 3 is a perspective view of the closure of FIG. 1 with a cover of the closure made transparent to allow viewing of optical adapters and optical connectors disposed within the closure.

As shown in FIG. 3, the closure 100 includes a base 100 and a cover 130 that cooperate to define an interior 107 in which the termination arrangement 120 is disposed. In certain implementations, the axial pull-protection is integrated into the cover 130. Accordingly, removing the cover 130 from the base 110 provides full access to the connectorized ends 142 of the optical cables 140. Mounting the cover 130 to the base 110 provides the axial pull-protection to the connectorized ends 142 of any optical cable 140 held within the closure 100.

In the example shown, the base 110 defines the rear 102 of the closure 100 and the cover 130 defines the front 101 of the closure 100. In other examples, however, the base 110 and cover 130 can define or cooperate to define other sides of the closure 100. The base 110 defines an input cable channel 113 and the cover 130 defines an input cable channel 133. The input cable channels 113, 133 of the base 110 and cover 130 cooperate to define an input cable passage when the cover 130 is mounted to the base 110. In the example shown, the input cable channels 113, 133 are defined in both the top 105 and bottom 106 of the base 110 and cover 130. In other examples, only one of the top 105 and bottom 106 may define the channels 113, 133.

In some implementations, the cover 130 defines an aperture 135 through which the optical cables 140 extend. In the example shown, the aperture 135 is defined at a bottom 106 of the cover 130. In other implementations, the base 110 cooperates with the cover 130 to define the aperture 135. In still other implementations, the base 110 can define the aperture through which the optical cables 140 extend.

The base 110 is configured to mount to a surface (e.g., a wall). In certain implementations, the base 110 includes attachment members 111 defining fastening apertures 112 that facilitate mounting the base 110 to a surface. The cover 130 removably mounts to the base 110. In certain implementations, the cover 130 is slidable relative to the base 110. In the example shown, the cover 130 is configured to slide relative to the base 110 in a forward direction to remove the cover 130 and in a rearward direction to mount the cover 130.

The termination arrangement 120 mounts to the base 110 and includes a housing 121 carrying one or more termination adapters 122. In some implementations, the termination arrangement 120 also includes other components, such as an optical splitter, a wave division multiplexer, and optical fiber management members (e.g., cable spools, bend radius limiters, etc.). In an example, the termination arrangement is a splitter module including optical adapters 122 having inner ports at which split signals are received. The inner ports align with output ports 125 of the adapters 122 to allow optical coupling of optical fibers received thereat. In the example shown, the output ports 125 face towards the aperture 135 through which the cables 140 extend.

In certain implementations, the termination arrangement 120 includes multiple adapters 122 disposed along the width W of the closure 100. In certain implementations, the termination arrangement 120 can include adapters 122 arranged in layers along the depth D of the closure 100. In the example shown in FIG. 3, the termination arrangement 120 includes four layers of adapters 122 with each layer including four adapters 122. In other examples, the termination arrangement 120 can have a different number of layers (e.g., one layer, two layers, three layers, six layers, etc.) and/or a different number of adapters 122 in each layer. In the example shown, the adapters 122 in each layer are aligned in a row. In the example shown, the layers are arranged so that the adapters 122 form columns along the depth D of the closure 100.

In certain implementations, the optical connectors 142 include a connector body 143 configured to hold an optical fiber (e.g., with a ferrule) and a strain-relief boot. In examples, the strain-relief boot is disposed rearward of the connector body 143. In the example shown, the optical connectors 142 are standard SC connectors. For example, in such an example, the termination adapters 122 include internal latching members that engage latching openings on the SC connectors 142. The SC connectors 142 are removed by pulling on outer grip housings of the connectors 142. In other examples, however, other types of optical connectors 142 may be utilized (e.g., LC connectors, MPO connectors, LX.5 connectors, etc.).

Figure 4:
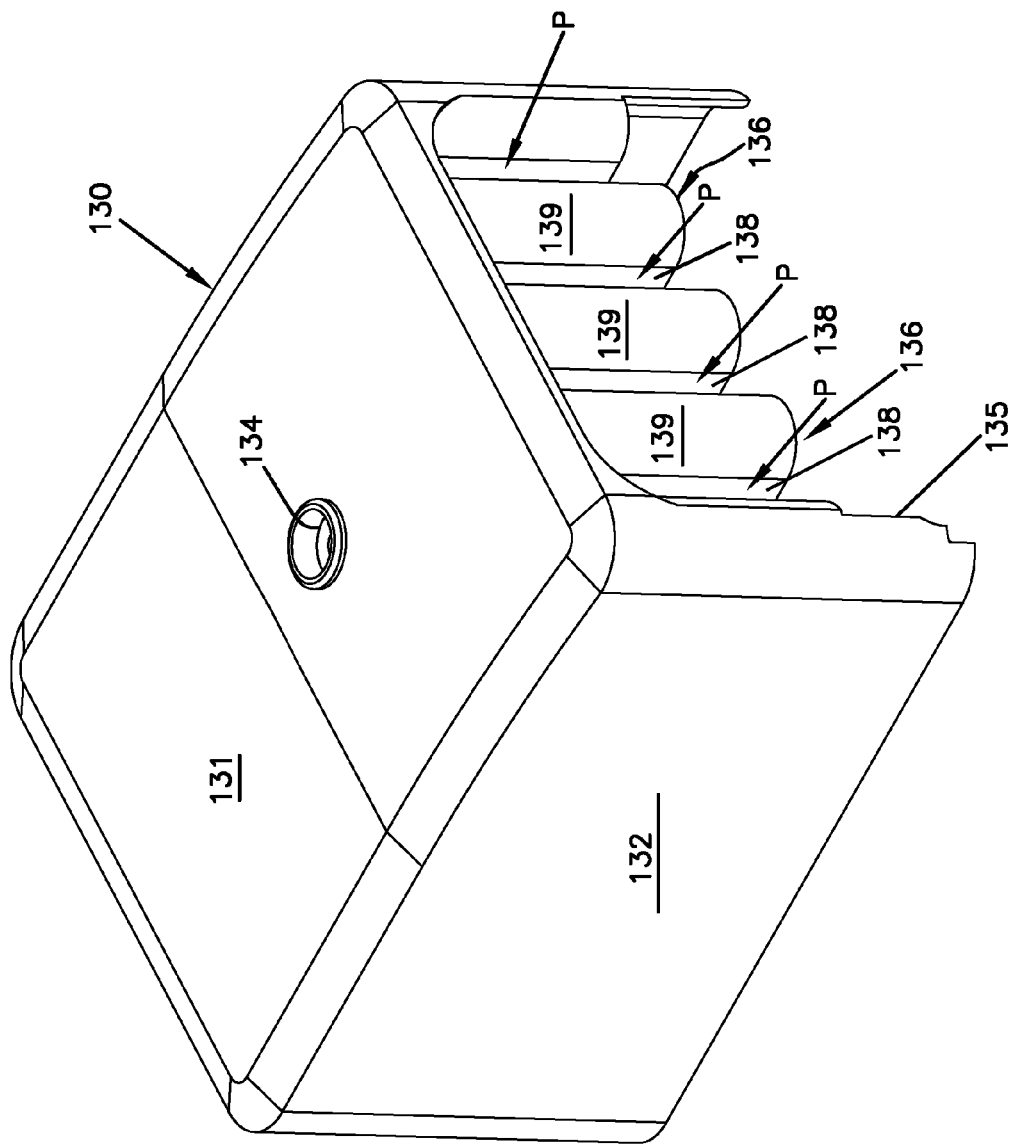
FIG. 4 is a front perspective view of the cover of the closure of FIG. 1.
Figure 5:
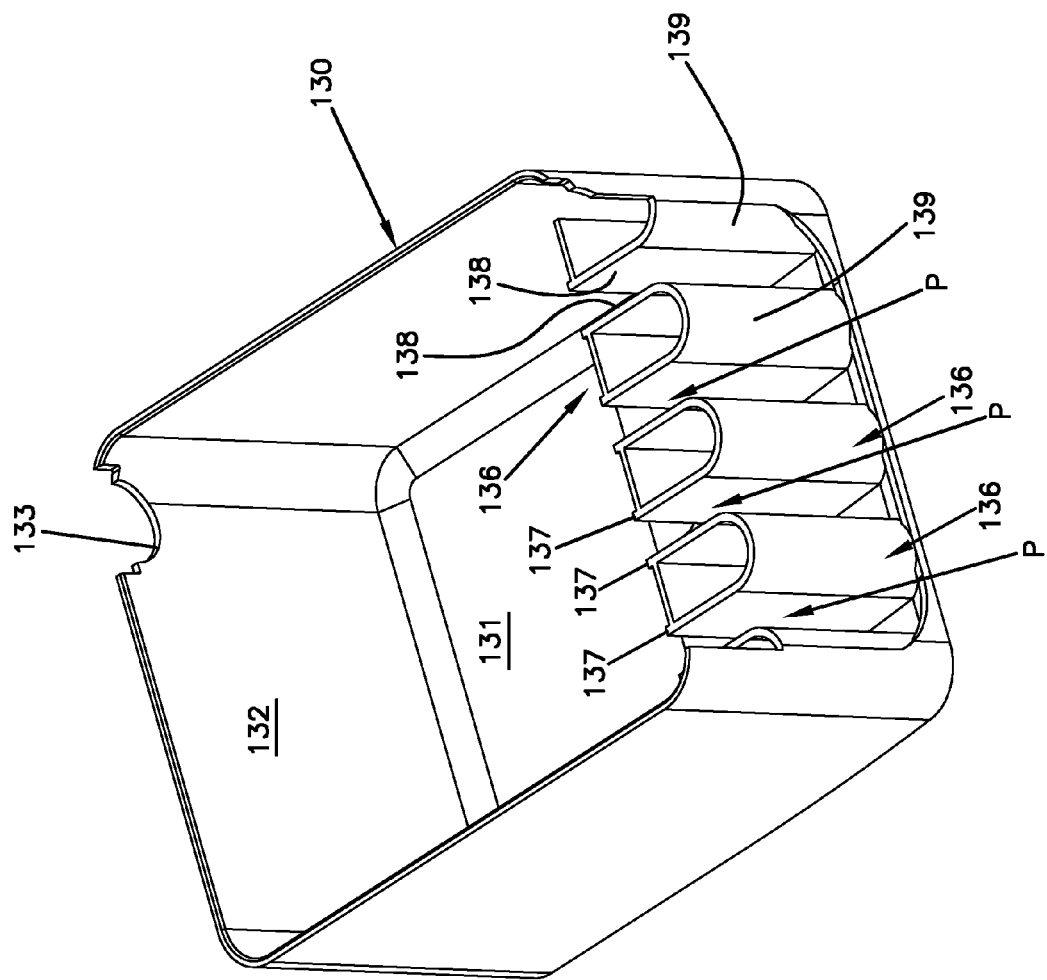
FIG. 5 is a rear perspective view of the cover of FIG. 4.

FIGS. 4 and 5 illustrate an example cover 130 configured to provide axial pull-protection to the cables 140 plugged into the adapters 142. The cover 130 includes a side wall 142 extending rearwardly from a front wall 131. A bottom of the sidewall 142 defines the aperture 135. At least a top of the sidewall 142 defines the input cable channel 133. A locking arrangement can be provided to secure the cover 130 to the base 110. For example, the front wall 131 of the cover 130 may define an opening 134 through which a lock or fastener may extend to secure the cover 130.

The cover 130 includes one or more guide elements 136 extending rearwardly from the front wall 131. In certain implementations, the guide elements 136 extend in a row along the width W of the closure 100. The guide elements 136 cooperate to define passages P through which the optical cables 140 pass when routed through the aperture 135 and to the termination arrangement 120. The passages P are vertically aligned with the output ports 125 of the adapters 122. In certain implementations, each guide element 136 includes one or more guide walls 138. Each guide wall 138 opposes a guide wall 138 of an adjacent guide element 136 to define one of the passages P.

In certain implementations, each guide element 136 defines a transition surface 139 that faces the aperture 135. In certain examples, each transition surface 139 extends away from one or more the guide walls 138 in a curve that provides bend radius protection to cables 140 extending through the aperture 135. In the example shown, three of the guide elements 136 each include a transition surface 139 that connects two guide walls 138. Two of the guide elements 136 define a transition surface 139 that extends away from a single guide wall 138. The guide elements with a single guide wall 138 are disposed on opposite sides of the guide elements 136 having two guide walls 138. In other examples, each of the guide elements 136 may have two guide walls 138.

In certain implementations, each guide element 136 defines one or more support surfaces 137 that face towards the output ports 125 of the adapters 122. The guide elements 136 are sized and positioned so that the support surfaces 137 align with the optical connectors 142 terminating the optical cables 140 when the optical connectors 142 are received at the output ports 125 and the cover 130 is mounted on the base 110. In certain implementations, the support surfaces 137 are defined at the tops of the guide walls 138. In other implementations, the support surfaces 137 are defined by platforms extending upwardly from the guide walls 138 or other portions of the guide elements 136.

Figure 6:
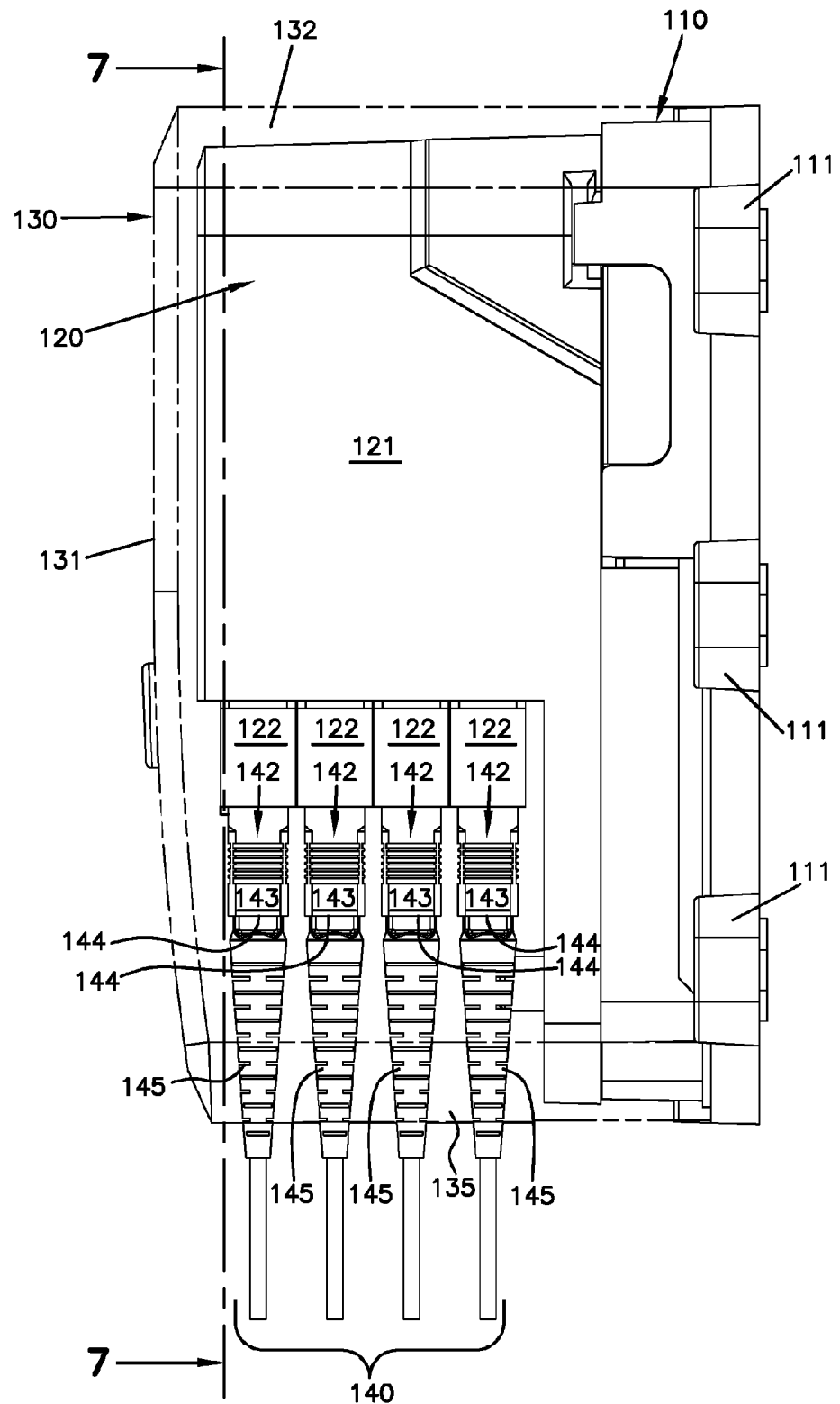
FIG. 6 is a side elevational view of the closure of FIG. 3.
Figure 7:
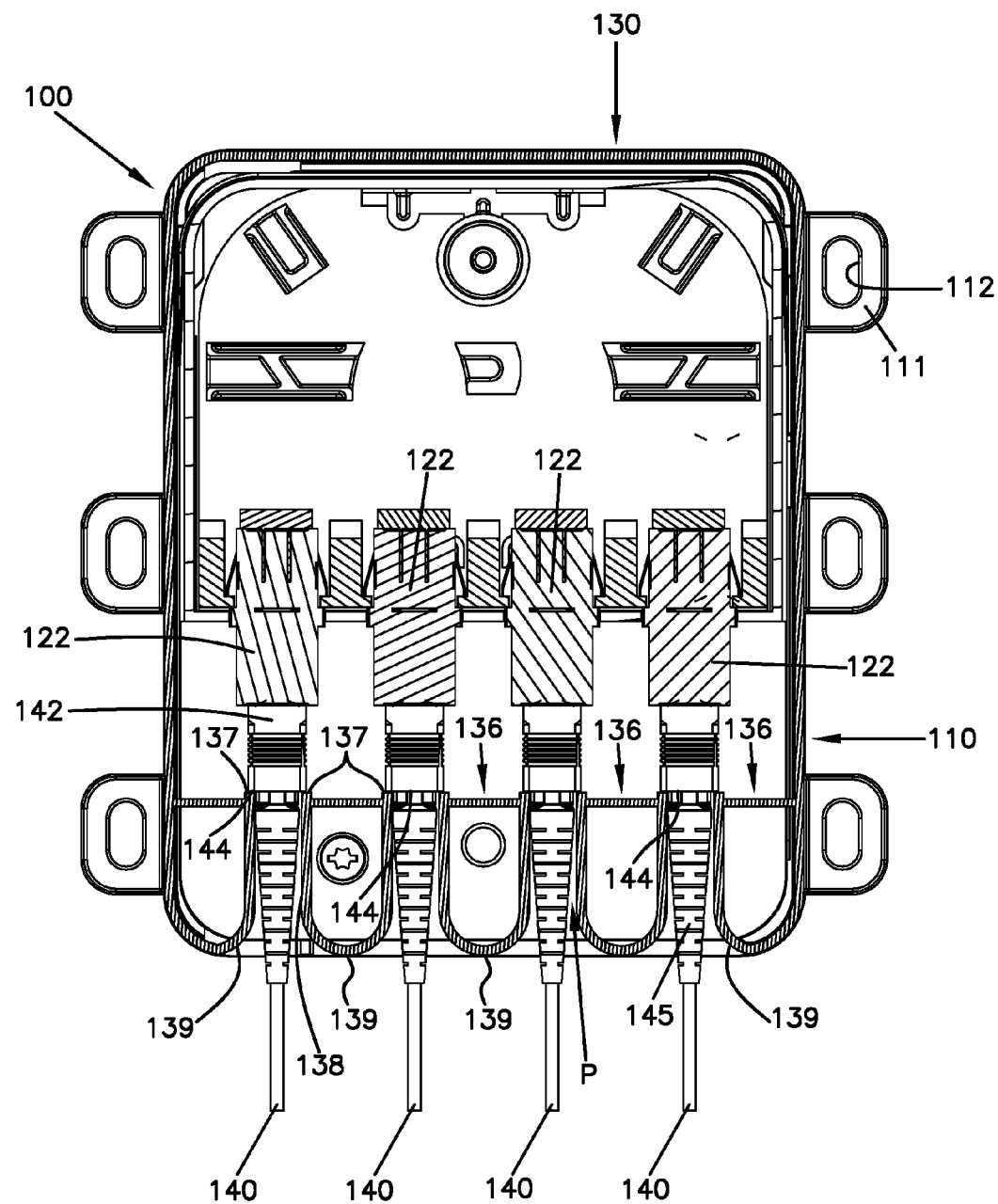
FIG. 7 is a cross-sectional view of the closure of FIG. 6 taken along the 7-7 line of FIG. 6.

As shown in FIGS. 6 and 7, mounting the cover 130 to the base 110 positions the guide elements 136 relative to the output ports 125 so that at least portions of the support surfaces 137 of the guide elements 136 vertically align with the output ports 125. Any optical connectors 142 received at the output ports 125 extend downwardly towards the guide elements 136. The guide elements 136 are horizontally positioned (e.g., along the width W of the closure 100) relative to the output ports 125 so that the cables 140 pass through the passages P without bending. In certain implementations, the guide elements 136 are vertically positioned so that the strain-relief boots 145 of the cables 140 extend through the passages P. By vertically aligning the passages P with the strain-relief boots 145, squeezing or pinching of the optical cables 140 (e.g., by the guide walls 138 or other portions of the guide elements 136) is inhibited.

The guide elements 136 are vertically positioned (e.g., along the length L of the closure 100) so that the support surfaces 137 engage or almost engage the rear edges 144 of the connector housings 143 of any optical connectors 142 received at the output ports 125. In certain implementations, the rear edge 144 of each optical connector housing 143 engages support surfaces 137 of two guide elements 136. For example, the rear edge 144 may straddle the gap between two adjacent guide elements 136 to engage respective support surfaces 137 (e.g., see FIG. 7). In certain implementations, the support surfaces 137 extend along a depth D of the cover 130 so that each support surface 137 can engage the rear edge 144 of multiple optical connectors 142 (e.g., arranged in multiple layers). For example, each support surface 137 can engage the rear edges 144 of optical connectors 142 arranged in a column along the depth D of the closure 100.

In certain implementations, the adapters 122 are carried by the termination arrangement 120 so that the adapters 122 can move vertically relative to the housing 121 of the termination arrangement 120. Accordingly, when the cover 130 applies an upward pressure on the connectors 142 received at the output ports 125, the connectors 142 can apply an upward pressure on the adapters 122 to move the adapters 122 into the housing 121. Allowing the adapters 122 to so move ensures that an axial pull-load is taken by the support surfaces 137 of the guide elements 136 despite manufacturing tolerances of the closure 100 and connectors 142.

As shown, support surfaces 137 and guide walls 138 extend generally axially relative to the connector and adapter axes, resulting in strong and robust support by the cover 130 on the one or more layers of connectors 142 in the termination arrangement 120. As shown, the rear edge 144 of the optical connectors 142 (e.g., arranged in one layer or multiple layers) are each engaged by a support surface 137 on opposite sides of each connector, along an axial direction. In the illustrated example, the rear edges 144 of optical connectors 142 are the rear edges of the grip of the SC connectors. The grip is the outer housing portion of the connector 142 which controls latching and unlatching of the connector 142 with the 122 of a conventional SC connector.

To insert or remove a connector 142 to or from the closure 100, the cover 130 is removed from the base 110. For example, the cover 130 can be slid forwardly relative to the base 110. Removing the cover 130 removes the guide elements 136 from between the cables 140. Removing the guide elements 136 removes the support surfaces 137 from the connector housings 143. Accordingly, removing the cover 130 provides full access to the optical connectors 142 and output ports 125 of the adapters 122. Any of the optical connectors 142 can then be removed from one of the output ports 125 (e.g., by pulling on a grip housing of the optical connector 142). Mounting the cover 130 to the base 110 engages the support surfaces 137 with the connector housings 143.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES 100 closure
101 front
102 rear
103 first side
104 second side
105 top
106 bottom
107 interior
110 base
111 attachment members
112 fastening aperture
113 input cable channel
120 termination arrangement
122 termination adapters
125 output ports
130 cover
131 front wall
132 side walls
133 input channel
134 opening
135 aperture
136 guide elements
137 support surfaces
138 guide walls
139 transition surface
140 Cables
142 optical connectors
143 connector housing
144 rear edge
145 boot

What is claimed is:

1. A telecommunications closure comprising:
a base;
a cover that cooperates with the base to define an interior;
a cable input to the base;
a plurality of cable outputs from the base;
the cover supporting the cable outputs in the form of at least one row/layer of fiber optic plug connectors from axial pull by engagement with projecting walls which engage projecting end surfaces of the plug connectors in an axial direction.

2. The closure of claim 1, further comprising a plurality of rows/layers of fiber optic plug connectors.

3. The closure of claim 1, further comprising cable bend protection formed by the projecting walls of the cover.

4. The closure of claim 1, wherein the projecting walls are formed by one or more guide elements extending rearwardly from a front wall of the cover.

5. The closure of claim 4, wherein the guide elements extend in a row along the width of the closure.

6. The closure of claim 4, wherein the guide elements cooperate to define passages through which optical cables pass when routed through an aperture defined at a bottom of the cover.

7. The closure of claim 6, wherein a termination arrangement mounts to the base, wherein the termination arrangement includes one or more termination adapters, and wherein the passages are vertically aligned with output ports of the termination adapters, wherein the fiber optic plug connectors are received at the output ports of the termination adapters.

8. The closure of claim 6, wherein each guide element defines a transition surface that faces the aperture, each transition surface extends away from one or more guide walls in a curve that provides bend radius protection to the optical cables extending through the aperture.

9. The closure of claim 7, wherein each guide element defines one or more support surfaces that face towards the output ports of the termination adapters.

10. The closure of claim 9, wherein the guide elements are sized and positioned so that the support surfaces align with the optical plug connectors terminating the optical cables when the optical plug connectors are received at the output ports and the cover is mounted on the base.

11. The closure of claim 9, wherein the support surfaces are defined at tops of guide walls defined by the guide elements.

12. The closure of claim 9, wherein the support surfaces are defined by platforms extending upwardly from guide walls defined by the guide elements.

13. The closure of claim 4, wherein the guide elements are positioned on opposite sides of each fiber optic plug connector.

14. A telecommunications closure comprising:
a base;
a cover;
a cable input to the base;
a plurality of cable outputs from the base, each cable output being terminated by a fiber optic connector having a connector body and a strain-relief boot, each connector body being configured to hold an optical fiber, each connector body having a rear edge;

the cover supporting the cable outputs in the form of multiple rows/layers of fiber optic connectors from axial pull with projecting guide elements positioned on opposite sides of each fiber optic connector, each projecting guide element defining a support surface that engages the rear edge of the connector body of one of the cable outputs.

15. A telecommunications closure comprising:

a base;

a cover;

a cable input to the base;

a termination arrangement mounted to the base, the termination arrangement including a plurality of adapters, each adapter defining a first port and a second port;

a plurality of cable outputs from the base including at least one row/layer of fiber optic connectors received at the second ports of the termination adapters;

the cover supporting the cable outputs from axial pull with projecting guide elements positioned on opposite sides of each fiber optic connector, each projecting guide element forming a cable bend protection element on opposite sides of each fiber optic connector.

16. The telecommunications closure of claim 14, wherein the rear edge of the connector body of each cable output engages the support surfaces of two of the guide elements.

17. The telecommunications closure of claim 14, wherein the support surfaces of the guide elements extend along a depth of the cover so that each support surface engages the rear edges of the cable bodies of multiple ones of the cable outputs.

18. The telecommunications closure of claim 17, wherein each support surface engages the rear edges of fiber optic connectors arranged in a column along a depth of the base.

19. The telecommunications closure of claim 15, wherein the termination arrangement includes a body holding the fiber optic adapters, and wherein the adapters are movable relative to the body of the termination arrangement.

20. The telecommunications closure of claim 19, wherein when the cover applies an upward pressure on the fiber optic connectors received at the second ports, the fiber optic connectors applying an upward pressure on the adapters to move the adapters into the body.

* * * * *

UNITED STATES PATENT AND TRADEMARK OFFICE
CERTIFICATE OF CORRECTION

PATENT NO. : 10,429,595 B2  
APPLICATION NO. : 15/560121  
DATED : October 1, 2019  
INVENTOR(S) : David Jan Irma Van Baelen Page 1 of 1

It is certified that error appears in the above-identified patent and that said Letters Patent is hereby corrected as shown below:

In the Claims

Column 6, Line 25, Claim 5: "along the width" should read --along a width--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*